United States Patent [19]

Hori et al.

[11] 3,899,677
[45] Aug. 12, 1975

[54] PLASTIC FOR INDICATING A RADIATION DOSE

[75] Inventors: Yutaka Hori; Nobuharu Yoshikawa; Saburo Ohmori, all of Osaka, Japan

[73] Assignee: Nitto Electric Industrial Co., Ltd., Ibaraki, Japan

[22] Filed: Nov. 29, 1973

[21] Appl. No.: 420,342

Related U.S. Application Data

[63] Continuation of Ser. No. 260,242, June 6, 1972, abandoned, which is a continuation of Ser. No. 840,478, July 9, 1969.

[30] Foreign Application Priority Data

July 9, 1968 Japan.............................. 43-48308
July 9, 1968 Japan.............................. 43-48309

[52] U.S. Cl................................ 250/474; 250/487
[51] Int. Cl................................................. G01t 1/12
[58] Field of Search......... 250/474, 487; 260/29.1 R

[56] References Cited
UNITED STATES PATENTS 3,290,499  12/1966  Vale.................................. 250/474
3,425,867  2/1969  Stillo................................. 117/230
3,743,846  7/1973  Matsumoto......................... 250/474

OTHER PUBLICATIONS

Basic Concepts in the Selection of Plasticizers for PVC by Myers; Rubber World, July 1948; pp. 530, 531.

*Primary Examiner*—Harold A. Dixon
*Attorney, Agent, or Firm*—Sughrue, Rothwell, Mion, Zinn & Macpeak

[57] ABSTRACT

A plastic film suitable for indicating radiation dose contains a chlorine polymer, at least one acid sensitive coloring agent and a plasticizer. The film undergoes a distinct change of color in response to a given radiation dose, the degree of change proportional to the total change. These films may be stored for a long period without loss of sensitivity, and have good color stability after irradiation.

17 Claims, No Drawings

PLASTIC FOR INDICATING A RADIATION DOSE

This is a continuation of application Ser. No. 260,242, filed June 6, 1972, and now abandoned, which is a continuation of Ser. No. 840,478, filed July 9, 1969.

BACKGROUND OF THE INVENTION

1. Field of the Invention

The present invention relates to a color film for indicating a total radiation dose characterized in that it undergoes various color changes for a given total dose when irradiated by ionization radiation and always shows the same color change for the same total dosage.

2. The Prior Art

Today, high-energy radiation, such as gamma rays radiated from $Co^{60}$ and electron rays generated by an electron accelerator, is broadly utilized in industry for such purposes as, for example, sterilization and disinfection of medical instruments such as an injection syringe, an injection cylinder, a suture gut, etc. improvement and sterilization of foodstuffs, and radiation polymerization, etc. In utilizing such high-energy radiation, from the viewpoint of the efficiency and safety, it is necessary to measure and control the irradiation dose by an appropriate and simple means. Various methods of measuring the dose have hitherto been developed. However, these methods suffer the defect of being complicated in operation and require a great deal of skill and time for measurement. They are also relatively expensive.

For these reasons, a color film for indicating a radiation does which is simple in operation and can be easily handled has been developed. This film comprises a plastic admixed with a coloring agent and it changes its color in response to a given dose.

The name "color film for indicating a radiation dose" is one used in ENEA (European Nuclear Energy Agency) in the system of OECD (Organization for Economic Cooperation and Development) and a color film has been desired suitable for measuring dose in the irradiation of foodstuffs by the above organizations.

However, conventional color films for indicating radiation dose suffer from defects in the field of practical performances such as poor color development. That is, change of color per a given dose is not distinct. Further, these films lack heat-, light-, and moisture-resistances over long periods of time and lack stability of color after irradiation.

An object of the present invention therefore is to provide a plastic for indicating a radiation dose which shows a clear change of color for a given dose, is stable over long periods of time, and has good color stability after irradiation.

SUMMARY OF THE INVENTION

The present invention relates to a plastic for indicating a radiation dose which comprises a chlorine containing polymer, at least one kind of acid sensitive coloring matter and a plasticizer.

The chlorine-containing polymer is one which contains chlorine and can be molded. Suitable polymers include, for example, polyvinyl chloride, vinyl chloride-vinyl acetate copolymer, vinylidene chloride polymer, vinyl chloride-acrylic acid copolymer, and chlorinated polyethylene.

These polymers may be used alone or in admixture. The degree of polymerization is 350 to 1300, preferably 500 to 1000. The chlorine content of the polymer is usually 30 to 80 percent by weight, preferably 50 to 70 percent, by weight, based on the weight of polymer. When using a copolymer, e.g. vinyl chloride and another monomer, the amount of vinyl chloride is suitably 76 to 97 percent, by weight, based on the total monomers.

The acid sensitive coloring agent is one which discolors or loses color as a function of acidity and capable of being used as a pH indicator. Such coloring agents include aniline blue, aniline yellow, benzene azo diphenylamine, methyl yellow, diethyl yellow, meta-methyl red, methyl violet, gentiana violet, crystal violet, congo red, quinoline, etc.

Two or more coloring agents differing in sensitivity to radiation (the degree of color change corresponding to the variation in irradiation dose), may be variously combined and used. Likewise, a coloring agent which changes color in response to irradiation may be combined with a coloring agent which loses color. Thus, the possible types of color changes due to variation of radiation dose are quite numerous. The higher radiosensitive coloring agents include, aniline yellow, diethyl yellow, aniline blue, meta-methyl red, etc. The lower radiosensitive coloring agents include benzene azo diphenylamine, methyl violet, gentiana violet, crystal violet, etc.

The coloring agents which change to different color by irradiation include methyl yellow, aniline yellow, congo red, diethyl yellow, meta-methyl red, benzene azo diphenylamine, etc. The coloring agents which lose color include aniline blue, quinoline, etc. The combination of aniline blue, aniline yellow and benzene azo diphenylamine is a particularly preferable one. As the radiation dose is increased, aniline blue changes from blue to colorless, aniline yellow discolors from yellow to pink and benzene azo diphenylamine discolors from yellow to violet. Accordingly, by combining the above three agents appropriately, a plastic for indicating a radiation dose can be obtained which develops a definite bright and distinct color change from green as a starting point to light green → yellow → orange → persimmon color → pink → purplish red → violet in response to given total doses. The dose in broad range can be easily observed with the naked eye. The plastic comprising the mixture of these three sensitive coloring agents has, in addition to the above characteristic, excellent preservation and stability characteristics.

The selection of the plasticizer is limited by the fact that the chlorine-containing polymer for indicating a radiation dose in the present invention releases hydrogen chloride when irradiated and it is the hydrogen chloride that acts to discolor or fade the coloring agents. Thus, the plasticizer should not react with the polymer to inhibit the production of hydrogen chloride nor inhibit the function of the produced hydrogen chloride. Further, the plasticizer is preferably higher in boiling point than the plastic so as not to be dispersed by heating at the time of preparing the plastic, or subsequently dispersed during storage. The plasticizer should also be miscible with, and not damaging to the characteristic of the product, Suitable plasticizers which have the above requirements and have excellent color stability after irradiation and preservation before irradiation are phosphoric acid esters, polyesters, chlorinated paraffin, trimellitic acid esters of aliphatic alcohol, and mixtures thereof. The phosphoric acid esters include phosphoric acid esters of aliphatic alcohols, phenols, cresols, etc., for example, trioctyl phosphate, triphenyl phosphate, tricresyl phosphate, trichloroethyl phosphate, etc. The polyesters include for example, adipic acid ester of ethyleneglycol, sebacic acid ester of ethylene-glycol, etc. The chlorinated paraffin is suitably chlorinated to 30 to 80 percent, by weight. The trimellitic acid esters include esters of aliphatic alcohols, preferably having 5 to 20 carbon atoms, for example, 2-ethylhexyl alcohol, isodecyl alcohol, etc.

The amount of each material to be used is not strictly limited, although the amount of acid sensitive coloring agent to be used is usually 0.1 to 5.0 parts, by weight, preferably 1.0 to 1.5 parts, by weight, on the basis of 100 parts, by weight, of chlorine-containing polymer. However, if less than 0.1 part, by weight, is used, then the discoloration after irradiation is too slight to evaluate. If more than 5.0 parts, by weight, are used, there is no increase in distinctness or sensitivity, and such results only in increased costs.

The amount of plasticizer to be used is 5 to 80 parts, by weight, preferably 20 to 50 parts, by weight. As the amount decreases below 5 parts by weight the discoloration due to irradiation dose is gradually reduced and the preservation before irradiation is decreased. Alternatively, as the amount increases above 80 parts by weight, the color stability after irradiation and the preservation before irradiation are reduced.

The plastic for indicating a radiation dose in the present invention can be optionally molded into any shape, for example, film, sheet, plate, and the like, depending upon the intended use. It may also be molded on an appropriate support. However, from a practical and economical viewpoint, the plastic is preferably used in the form of film 30 to 50μ thick.

DETAILED DISCLOSURE OF THE PREFERRED EMBODIMENT

By one method of making the present product, the above-described chlorine-containing polymer, coloring agent and plasticizer are dissolved in a suitable organic solvent such as cyclohexane, cyclohexanone, methylethyl ketone, dimethylformamide, tetrahydrofuran, etc. in such a way that the total content of the above three materials is 10 to 60 percent by weight. The solution is flow-spread on the surface of a non-adhesive carrier such as, for example, silicon-treated paper, fluorine-resin film, etc., and therafter dried by heating or at ordinary temperatures to form a film layer for indicating a radiation dose on the surface of the substrate. The thus dried film is then peeled from the substrate. By another method of making the product, the above solution is flow-spread on the surface of carrier such as a plastic film, for example, polyester, polypropylene, fluorine resin, polyamide, and polyvinylchloride, a paper coated with plastic, and a metallic foil such as an aluminum foil, and thereafter dried by heating or at ordinary temperatures to provide a film layer for indicating a radiation dose on the carrier. It is preferable to prevent the plasticizer contained in the film layer from migrating and for this purpose aluminum foil, polyester film, polypropylene film, and fluorine, resin film are preferable as a carrier. In general, a width of 15 to 50μ is sufficient to prevent the movement of plasticizer. The carrier is conveniently colored by an opaque coloring material such as white so as not to interfere with the observation of the color change of the film. The plastic for indicating a radiation dose may also be formed by impregnating a porous carrier such as porous paper, nonwoven cloth, woven cloth, etc. with the above solution composition. The retained solvent is preferably less than 5 percent, by weight, of the radiation sensitive components (that is, chlorine-containing polymer, coloring matter, plasticizer, remaining solvent). As the amount increases above 5 percent by weight, the color stability after irradiation and the stability before irradiation becomes gradually worse.

The carrier may be provided with an adhesive layer such as a pressure sensitive adhesive, a solvent activating adhesive, etc. on at least one portion of carrier surface. Where the carrier is transparent, an opaque coloring agent of white, silver, or gold, etc. may be mixed into the adhesive layer, whereby the color change of film layer is less influenced by the color of body to which it is adhered. Between the film layer and the adhesive layer a film comprising polyester, polypropylene, fluorine resin, etc. or an aluminum foil is preferably interposed to prevent the movement of plasticizer.

The color film for indicating a radiation dose according to the present invention is characterized in that:

1. the color change per a given dose by irradiation is bright and clear and the radiation dose can be sufficiently recognized and detected by naked eye or by comparing with a standard color table;

2. the preservation before irradiation is good, that is, even in the case of irradiating a film after prolonged storage, a constant color change is always developed for a given dose;

3. the color stability after irradiation is good, that is, the color after irradiation does not change with the passage of time; and 4. in the case where an adhesive layer is provided, the film can be applied anywhere it is desired to measure a radiation dose.

The present invention will be illustrated with the following examples:

EXAMPLE 1

100 parts, by weight, of polyvinylchloride (virgin resin) were dissolved in 400 parts of tetrahydrofuran, and 0.6 part of aniline blue, 0.3 parts of aniline yellow and 0.3 part of benzene azo diphenylamine were added and further 40 parts of chlorinated paraffin, 40 percent chlorination, were added thereto. The resulting solution was flow-coated on a polyester film and heated at 100°C. for 10 minutes and thereafter peeled from the polyester film to obtain a color film for indicating a radiation dose, which is 40μ thick and contains less than 5 percent by weight, of tetrahydrofuran. The resulting film was dark green. Its performance is as shown in Table 1.

EXAMPLE 2

100 parts, by weight, of polyvinyl chloride (virgin resin) were dissolved in 400 parts of tetrahydrofuran, and 0.6 part of aniline blue, 0.3 part of aniline yellow and 0.3 part of benzene azodiphenylamine were added and further 30 parts of trichloroethyl phosphate were added. The resulting solution was flow coated on a silicon treated paper and thereafter heated at 100°C. for 8 minutes to dy so that less than 5 percent by weight, of the solvent remained. The film was then peeled from the silicone treated paper to obtain a color film for indicating a radiation dose, which is 40μ thick. The film is dark green. Its performance is shown in Table 1.

EXAMPLE 3

100 parts of polyvinyl chloride (virgin resin) were dissolved in 400 parts of tetrahydrofuran and 0.6 part of aniline blue, 0.3 part of methyl yellow, 0.3 part of benzene azo diphenylamine and 30 parts of adipic acid polyester having 1000 to 2000 of molecular weight were added thereto. The resulting solution was flow coated on the surface of white opaque polyester film and thereafter heated at 100°C. for five minutes to dry so that 5 percent by weight of the solvent remained. A color film for indicating a radiation dose, which is 40μ thick is obtained which has a white opaque polyester film layer on one side. The film is dark green, and its performance is shown in Table 1.

EXAMPLE 4

Methyl red was substituted for methyl yellow in Example 3 to give substantially the same result as in Example 3.

EXAMPLE 5

Diethyl yellow was substituted for methyl yellow in Example 3 to give substantially the same result as in Example 3.

EXAMPLE 6

Example 3 was repeated with the exception of using aniline yellow and aniline blue to give a film indicating a bright color change from green to red.

EXAMPLE 7

Methyl yellow as substituted for aniline yellow in Example 6 to give the same film as in Example 6.

EXAMPLE 8

Diethyl yellow was substituted for aniline yellow in Example 6 to give the same film as in Example 6.

EXAMPLE 9

Methyl red was substituted for aniline yellow in Example 6 to give the same film as in Example 6.

EXAMPLE 10

Cyclohexanone was substituted for tetrahydrofuran in Example 1 to give the same result.

EXAMPLE 11

Diethyl formamide was substituted for tetrahydrofuran in Example 1 to give the same result.

EXAMPLE 12

Dioxane was substituted for tetrahydrofuran in Example 1 to give the same result.

EXAMPLE 13

Vinylacetate-vinyl chloride copolymer having a polymerization degree of 800 and the vinyl acetate content of 26 percent by weight, was substituted for polyvinyl chloride in Example 1 to give substantially the same result in Example 1.

EXAMPLE 14

40 parts of 2-ethyl hexyl ester of trimellitic acid was substituted for 40 parts of chlorinated paraffin in Example 1 to give substantially the same result in Example 1.

COMPARATIVE EXAMPLE 1

The performance of the product having the same composition and obtained by the same method as in Example 1 and having the tetrahydrofuran content of about 8% by weight, is shown in Table 1.

COMPARATIVE EXAMPLE 2

The performance of the product obtained by the same method as in Example 1 and not added with a plasticizer such as chlorinated paraffin and having the tetrahydrofuran content of about 8 percent by weight, is shown in Table 1.

COMPARATIVE EXAMPLE 3

The performance of the similar product as in Comparative Example 2 with the exception of having the tetrahydrofuran content of 5 percent by weight, is shown in Table 1.

COMPARATIVE EXAMPLE 4

The performance of the product obtained by the method in Example 1 with the exception of using dioctylphthalate for chlorinated paraffin and having the tetrahydrofuran content of less than 5 percent by weight, is shown in Tables 1 and 2.

As apparent from the above Examples and Comparative Examples, where the plasticizer is not added, the color change is less as shown in Table 1, and the obtained color film has reduced brightness and stability.

However, the present color film for indicating a radiation dose is excellent in color variation, color stability and stability.

EXAMPLE 15

100 parts of polyvinylchloride were dissolved in 400 parts of tetrahydrofuran, and 0.6 part of aniline blue, 0.3 part of aniline yellow, 0.3 part of benzene azo diphenylamine and 30 parts of trichloroethyl phosphate were added thereto. The resulting solution was coated on one side of polyester film the other side of which had a white opaque pressure sensitive adhesive layer comprising natural rubber or synthetic resin and was adhered with release paper (silicon treated paper) on the layer face, and heated at 100°C. for 8 minutes to dry to provide a color film layer for indicating a radiation dose, which is 40μ thick, on the above face of polyester film the color film so provided is dark green and has the performance shown in Table 3.

And also as a result of measuring the color stability after irradiation, it was found that the color in 1 hour after irradiation was the same as immediately after irradiation. Further, the preservation before irradiation was remarkably good. For example, even when preserved at 70°C. for one month, the reproduction of color change after irradiation was the same.

TABLE 1

| Sample | Irradiation Dose Megarad | Color-phase | Color Measuring Tape** | | | Color Stability After Irradiation | Preservation Before Irradiation | Variation of Co |
|---|---|---|---|---|---|---|---|---|
| | | | L | a | b | | | |
| Ex. 1 | 0 | Dark green | 26.75 | +1.90 | +2.30 | Good (not changed even after one week) | Very good (Reproduction is recognized even after preservation at 70°C. for one month) | Very good |
| | 1 | Green | 31.25 | +0.05 | +6.05 | | | |
| | 2 | Light green | 37.20 | +1.15 | +11.55 | | | |
| | 3 | Bright orange yellow | 42.65 | +6.45 | +16.05 | | | |
| | 4 | Bright orange red | 40.10 | +25.55 | +16.00 | | | |
| | 5 | Bright red to red purple | 33.50 | +33.65 | +11.05 | | | |
| Ex. 2 | 0 | Dark green | 28.50 | +0.65 | +2.80 | Good | Good | Very good |
| | 1 | Light green | 37.55 | −1.45 | +11.70 | Good | Good | Very good |
| | 2 | Bright orange | 41.25 | +29.25 | +16.15 | | | |
| | 3 | Bright orange persimmon | 34.20 | +40.20 | +11.25 | | | |
| | 4 | Bright persimmon | 32.65 | +39.50 | +9.75 | | | |
| | 5 | Bright persimmon red | 30.55 | +38.65 | +7.25 | | | |
| Ex. 3 | 0 | Dark green | 28.55 | −0.80 | +0.50 | Somewhat good | Good | |
| | 1 | Green | 39.65 | −3.65 | +16.85 | | Good | |
| | 2 | Light green | 35.70 | −5.10 | +10.65 | (Slightly faded after one week) | | |
| | 3 | Bright orange | 48.60 | +5.50 | +19.35 | | | |
| | 4 | Bright orange persimmon | 40.20 | +20.70 | +17.50 | '' | | |
| | 5 | Bright persimmon red | 35.30 | +31.75 | +14.00 | '' | | |
| Comp. Ex. 1 | 0 | Dark green | 26.75 | +2.00 | +2.31 | No good (Remarkably faded after 24 hours) | No good (Reproduction of color change is lost after preservation at 70°C. for 1 day) | Good |
| | 1 | Green | 31.25 | +10.12 | +6.14 | | | |
| | 2 | Light green | 37.30 | +1.26 | +11.65 | | | |
| | 3 | Bright yellow orange | 42.66 | +6.57 | +16.14 | | | |
| | 4 | Bright orange red | 40.20 | +28.64 | +16.09 | | | |
| | 5 | Bright red to red purple | 33.60 | +33.14 | +11.10 | | | |
| Comp. Ex. 2 | 0 | Dark green | 22.67 | +1.88 | +1.12 | No good | No good | Good |
| | 1 | Dark green | 23.55 | +0.91 | +2.08 | | | |
| | 2 | Dark light green | 24.55 | +4.61 | +3.25 | | | |
| | 3 | Dull greenish yellow | 24.40 | +12.25 | +3.75 | | | |
| | 4 | Dull brown orange | 24.48 | +15.65 | +3.60 | | | |
| | 5 | Dull brown orange | 23.82 | +16.92 | +3.13 | | | |
| Comp. Ex. 3 | 0 | Dark green | 22.20 | +1.80 | +0.15 | Good (No change even after one week) | Good (Reproduction is recognized after preservation at 70°C. for one day) | No good |
| | 1 | Dark green | 22.75 | +3.53 | +1.5 | | | |
| | 2 | Dark brown red | 22.92 | +6.10 | +2.58 | | | |
| | 3 | Dark brown red | 23.02 | +15.95 | +3.00 | | | |
| | 4 | Dark brown red | 22.90 | +14.75 | +2.67 | | | |
| | 5 | Dark brown red | 22.75 | +13.95 | +2.25 | | | |
| Comp. Ex. 4 | 0 | Dark green | 30.25 | +1.80 | +2.15 | Slightly No good (Reduced by 1 rad in one week after irradiation) | Good (Reproduction is recognized after preservation at 70°C. for one day) | Good |
| | 1 | Green | 33.35 | 0 | +4.25 | | | |
| | 2 | Light green | 37.70 | +1.00 | +10.55 | | | |
| | 3 | Bright yellow orange | 45.95 | +12.05 | +16.30 | | | |
| | 4 | Bright persimmon | 44.45 | +25.65 | +16.00 | | | |
| | 5 | Bright persimmon red | 39.90 | +31.55 | +12.15 | | | |

Irradiation source: Co⁶⁰ 6000 Mrad/hour
**Colorimeter manufactured by Color Machine Co., Ltd.
(L), (a), (b): Direct reading method, ASTM designation: D 1365-55 T (1955)

TABLE 2

Color stability after irradiation in Comparative Example 4 (5 megarad irradiation)

| Day | Measured Data | | | Color Phase |
| --- | --- | --- | --- | --- |
| | L | a | b | |
| Immediately after | 39.90 | +31.55 | +1.75 | Bright persimmon red |
| After 1 day | 44.20 | +21.65 | +15.10 | Bright light persimmon red |
| After 7 days | 49.40 | +19.65 | +19.30 | Bright persimmon |

TABLE 3

| Irradiation Dose (megarad) | Color |
| --- | --- |
| 0 | Dark green |
| 1 | Green |
| 2 | Light green |
| 3 | Yellow orange |
| 4 | Orange red |
| 5 | Red purple |
| Irradiation Source | Co [60] |
| Dose: | 0.9 M rad/hour. |

What is claimed is:

1. A film comprising a stable plastic composition coated on one side of a carrier and an adhesive layer coated on at least a portion of the other side of said carrier, said stable plastic composition indicating a radiation dose by a distinct change or loss of color when irradiated with ionizing radiation, said composition consisting essentially of:
   a. a moldable chlorine-containing polymer having a chlorine content of from 30 to 80 percent by weight based on the weight of the polymer, said polymer releasing hydrogen chloride when irradiated with ionizing radiation;
   b. from 0.1 to 5 parts by weight, based on 100 parts by weight of said polymer, of aniline blue as an acid-sensitive coloring agent, and, at least one other acid-sensitive coloring agent which discolors or loses color, upon irradiation with ionizing radiation, by the action of the hydrogen chloride released from said polymer; and
   c. from 5 to 80 parts by weight, based on 100 parts by weight of said polymer, of a plasticizer which does not react with or inhibit the function of the hydrogen chloride released by said polymer upon irradiation with ionizing radiation and which has good color stability after irradiation with ionizing radiation, said plasticizer being selected from the group consisting of phosphoric acid esters, polyesters, chlorinated paraffins, and trimellitic esters of aliphatic alcohols.

2. The film of claim 1, wherein the adhesive layer contains an opaque coloring agent.

3. The film of claim 1, wherein the chlorine-containing polymer is selected from the group consisting of polyvinyl chloride, vinyl chloride/vinyl acetate copolymers, polyvinylidene chloride, vinyl chloride/acrylic acid copolymers and chlorinated polyethylene.

4. The film of claim 3, wherein the amount of vinyl chloride in said vinyl chloride/vinyl acetate copolymers and in said vinyl chloride/acrylic acid copolymers is from 76 to 97 percent by weight based on the weight of the copolymer.

5. The film of claim 1, wherein component (b) is a combination of 0.6 part by weight of aniline blue, 0.3 part by weight of aniline yellow, and 0.3 part by weight of benzene azo diphenylamine.

6. The film of claim 1, wherein component (b) is a combination of 0.6 part by weight of aniline blue, 0.3 part by weight of methyl yellow, and 0.3 part by weight of benzene azo diphenylamine.

7. The film of claim 1, wherein the chlorine content of the chlorine-containing polymer ranges from 50–70 percent by weight, based on the weight of said polymer.

8. The film of claim 1, wherein the total acid sensitive coloring agent is present in an amount of 1.0–1.5 parts by weight, based on 100 parts by weight of said chlorine-containing polymer.

9. The film of claim 1, wherein the plasticizer is present in an amount of from 20–50 parts by weight, based on 100 parts by weight of said chlorine-containing polymer.

10. The film of claim 1, wherein the degree of polymerization of the chlorine-containing polymer ranges from 350 to 1300.

11. The film of claim 10, wherein the degree of polymerization ranges from 500 to 1000.

12. The film of claim 1, wherein said phosphoric acid esters comprise the phosphoric acid esters of aliphatic alcohols, phenols or cresols.

13. The film of claim 1, wherein said polyester is the adipic acid ester of ethylene glycol or the sebacic acid ester of ethylene glycol.

14. The film of claim 1, wherein said chlorinated paraffin contains from 30 to 80 weight percent chlorine based on the weight of the chlorinated paraffin.

15. The film of claim 1, wherein said trimellitic ester is the trimellitic acid ester of an aliphatic alcohol having from 5 to 20 carbon atoms.

16. The film of claim 1, wherein said component (b) is a combination of aniline blue and another acid-sensitive coloring agent selected from the group consisting of aniline yellow, benzene azo diphenylamine, methyl yellow, diethyl yellow, meta-methyl red, methyl violet, gentiana violet, crystal violet, congo red and quinoline.

17. The film of claim 1, wherein said carrier comprises a material selected from the group consisting of aluminum foil, polyester film, polypropylene film and fluorine resin film.

* * * * *